United States Patent [19]
Beall

[11] Patent Number: 4,517,094
[45] Date of Patent: May 14, 1985

[54] PROCESS FOR TREATING ORGANICS CONTAMINATED WATER

[75] Inventor: Gary W. Beall, Austin, Tex.

[73] Assignee: Radecca, Inc., Austin, Tex.

[21] Appl. No.: 518,010

[22] Filed: Jun. 28, 1983

Related U.S. Application Data

[63] Continuation-in-part of Ser. No. 307,300, Sep. 30, 1981, abandoned, and a continuation-in-part of Ser. No. 419,301, Sep. 20, 1982, , and a continuation-in-part of Ser. No. 419,303, Sep. 20, 1982.

[51] Int. Cl.³ .............................................. B01D 15/00
[52] U.S. Cl. .................................... 210/664; 210/691; 210/694; 210/908; 210/909
[58] Field of Search ............... 210/663, 664, 679, 680, 210/691, 694, 908–910, 924; 252/428, 430

[56] References Cited

U.S. PATENT DOCUMENTS

| | | | |
|---|---|---|---|
| 2,254,745 | 9/1941 | Jannek | 210/694 |
| 2,367,384 | 1/1945 | Tymstra et al. | 210/680 |
| 3,597,167 | 8/1971 | Marks et al. | 210/664 |

Primary Examiner—Ivars Cintins
Attorney, Agent, or Firm—Stefan J. Klauber

[57] ABSTRACT

A method is provided for removing organic contaminants from an aqueous composition contaminated therewith. The method comprises passing the composition through a first column packed with an organoclay, to adsorb substantial quantities of high molecular weight and/or emulsified components of said organic contaminants, and passing the effluent from said first column through further separating means for separating substantial quantities of the low molecular components of said organic contaminants which remain in the effluent from said first column, and recovering the effluent from said separate means as product.

13 Claims, 4 Drawing Figures

G.C. SCAN OF EFFLUENT FROM ORGANOCLAY FOLLOWED BY ACTIVATED CHARCOAL AT 32 LITERS.

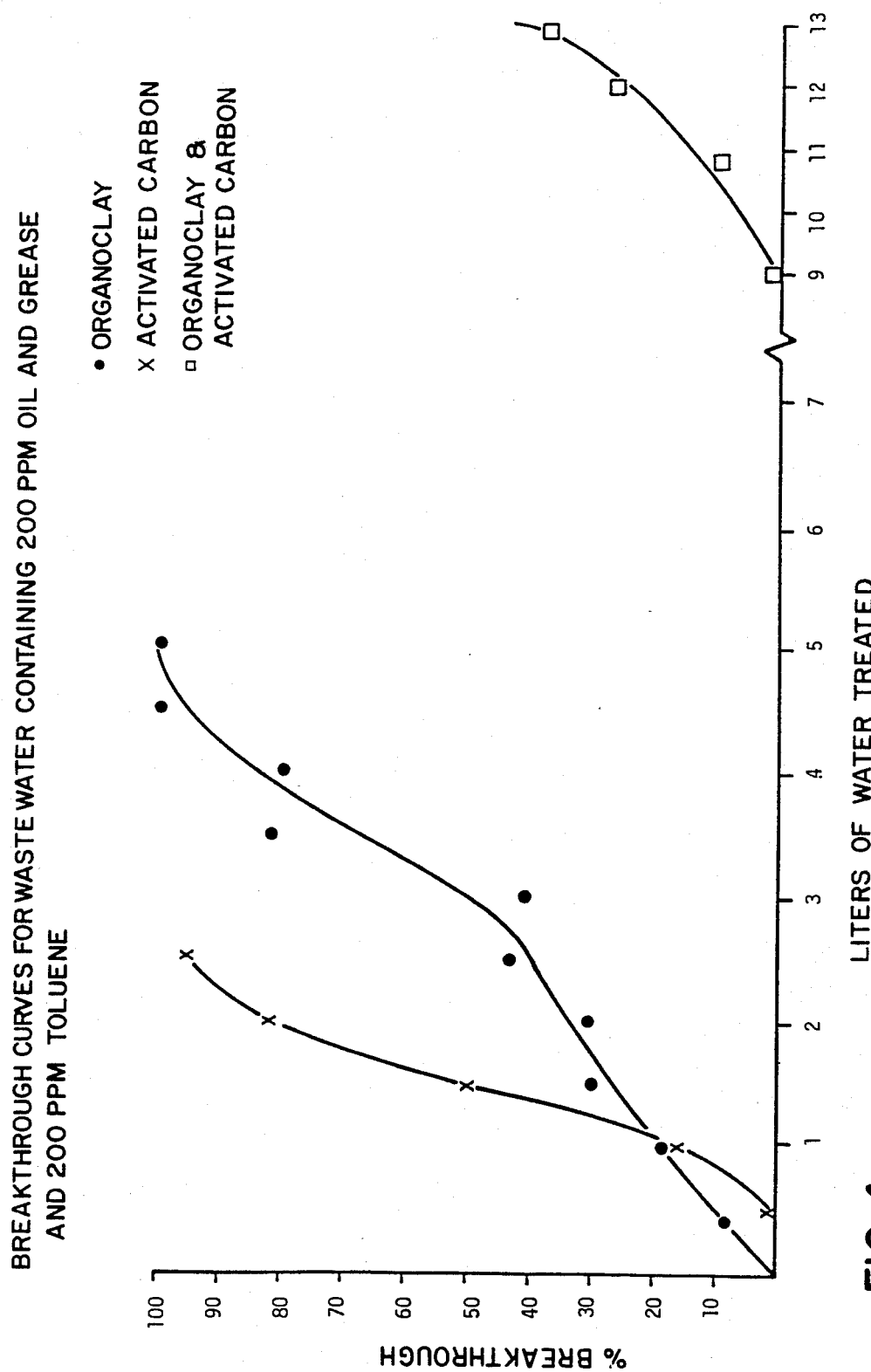

PROCESS FOR TREATING ORGANICS CONTAMINATED WATER

RELATED APPLICATIONS

This application is continuation-in-part of my co-pending applications, Ser. No. 307,300, filed on Sept. 30, 1981, and entitled "ORGANOCLAY WASTE DISPOSAL METHOD", now abandoned, Ser. No. 419,301, filed on Sept. 20, 1982, and entitled "METHOD OF REMOVING ORGANIC CONTAMINANTS FROM AQUEOUS COMPOSITIONS", and Ser. No. 419,303, filed on Sept. 20, 1982, and entitled "METHOD OF BREAKING EMULSIONS". The entire disclosures of these parent applications are incorporated herein by reference.

BACKGROUND OF THE INVENTION

1. Field of the Invention

This invention relates to a method for removing organic contaminants from aqueous compositions, and is particularly useful in the treatment of bodies of water or process streams which are contaminated with organics.

2. Prior Art

One of the major problems facing cities, chemical manufacturers, and industries using various chemicals, is waste disposal. More particularly, cities and industries are often faced with the need to dispose of aqueous compositions containing organic contaminants. Regulations make it impossible to simply dump such waste water into streams, even if such method of disposal were otherwise desirable. Various methods have been proposed for removing such contaminants from waste water, but they have been relatively expensive or inefficient. Therefore, the removal of contaminants from aqueous compositions, and in particular from waste water containing small amounts of contaminants, is a problem which has not been completely solved.

There exist numerous methods for removing organic contaminants from aqueous compositions, typically oil and water emulsions; see for example the following relevant U.S. patents: U.S. Pat. No. 2,367,384 to Tymstra; No. 2,937,142 to Rios; No. 3,196,619 to Shock; No. 3,487,928 to Canevari; No. 3,528,284 to Skoglund et al; No. 3,986,953 to Beaucaire; No. 4,231,866 to Moser et al; and No. 4,279,756 to Weiss et al More specifically, Tymstra describes a method for removing small quantities of water-immiscible organic oily impurities from water. The method consists of contacting the oily composition with an inert solid coated with a cation surface-active bonding agent. The solid employed may be beach sand, mud flat deposits, silt, clay, limestone, silica, rice hulls, etc. The cationic surface-active bonding agent may be quaternary ammonium, phosphonium, arsonium bases, or primary, secondary, or tertiary organic amines or salts thereof. This reference does not teach or suggest the use of the specific organoclays utilized herein to remove organic contaminants from aqueous compositions, nor the unexpected efficiencies of these clays.

Rios separates phenolic substances from aqueous solutions by contacting the aqueous solution with a clay adsorbent. The clay is previously treated by depositing carbonaceous material thereon, and then subjecting it to combustion regeneration to burn off the carbonaceous material.

Canevari separates droplets of oil from an aqueous phase, using a mixture comprising a sodium montmorillonite clay and an organic cationic agent or glycol. The organic cationic agent is preferably an amine. The mixture is applied as a flocculating clarifying solution containing from 1 to 5% of clay to water, and an effective amount of the organic cationic agent or glycol.

Beaucaire describes breaking an oil-water emulsion with waste-pickling acid solution, and thereafter converting the iron ions present in the waste-pickling solution to magnetite particles which absorb the oil. The magnetite particles and oil absorbed thereon are separated from the solution leaving a clarified solution.

Moser et al separates organic and aqueous phases by treatment of the emulsions with diatomaceous earth at an elevated temperature.

Weiss et al describes the use of a finely divided particulate mineral or clay material, the individual particles of which have been treated to produce a thin hydroxylated surface layer having a positive zeta potential at the adsorption pH.

None of the aforementioned references teach or suggest the use of the organoclays as in the present invention to remove organic contaminants from water.

Additionally, organoclays are well-known in the art, see for example the following U.S. patents: U.S. Pat. No. 2,531,427 to Hauser; No. 2,966,506 to Jordan; No. 3,422,185 to Kuritzkef; No. 3,974,125 to Oswald; No. 4,081,496 to Finlayson; and No. 4,105,578 to Finlayson et al None of these aforementioned references teach or suggest the use of these organoclays to remove organic contaminants from water.

In my Ser. Nos. 307,300 and 419,303 applications methods are disclosed for removing organic contaminants from an aqueous composition contaminated therewith. The method in general comprises contacting the aqueous composition with a sufficient amount of organoclay for a sufficient amount of time to absorb a substantial portion of the contaminant, and to form an aqueous organoclay admixture. The organoclay and aqueous composition are then separated from each other. The method is particularly useful for separating oily contaminants from water and toxic substance precursors, e.g. humic acid and other toxic organics (e.g. PCB's) from water.

Furthermore, in my aforementioned Ser. No. 419,303 application a method is disclosed for breaking emulsions of an organic composition and water or polar fluids. The method comprises contacting the emulsion with an emulsion-breaking amount of an organoclay to adsorb a major portion of the organic composition. Subsequently, a portion of the organoclay or water may be removed.

The methods of my aforementioned applications, while extremely effective, are less than ideal where one desires to remove from aqueous systems organic contaminants which comprise low molecular weight substances such as trichloroethane, chloroform, dichloroethane, etc. which are relatively quite soluble in water. Thus for example, if a mixture of gasoline and water is passed through a column packed with organoclays in accordance with my earlier inventions, the lower molecular weight higher solubility components such as benzene will tend to pass too readily through the column, while the higher molecular weight, lower solubility components such as toluene and xylene, will be more thoroughly retained at the column.

It has long been known in the prior art that activated carbons are very effective in adsorbing organic contaminants, including both high and low molecular weight substances. Such materials may for example be so used by packing a column with activated carbon granules and passing the aqueous composition through the column.

On the other hand activated carbon has a serious limitation where used to remove high molecular weight contaminants and/or emulsified contaminants. Such components tend to rapidly foul the carbon. This is particularly true if the materials are emulsified in the water. Under those circumstances a film tends to form upon the granulated carbon particles, rendering access to the high surface area difficult or impossible in rapid fashion. Thus the carbon is of limited use or at least has a quite limited life, after which it must be regenerated by time-consuming and costly treatments.

It is also well known that the aforementioned low molecular weight compounds are very amenable to air stripping. In the case of air stripping, the higher molecular weight compounds and oil tend, however, to form gums on the surfaces of the air stripping towers, thus adversely effecting the performance of the air stripping unit.

SUMMARY OF THE INVENTION

Now in accordance with the present invention a method is provided for removing organic contaminants from an aqueous composition contaminated therewith, which comprises passing the composition through a first column packed with an organoclay, to absorb substantial quantities of high molecular weight and/or emulsified components of said organic contaminants; passing the effluent from said first column through further separating means for separating substantial quantities of the low molecular components of said organic contaminants which remain in the effluent from said first column; and recovering the effluent from the further separating means. The further separating means preferably comprises a second column packed with porous activated carbon, which adsorbs the low molecular weight components. The effluent from the organoclay column may also be passed through an air stripping column to remove the water soluble components. In some cases both activated carbon and air stripping may be used.

In accordance with the present invention, an ideal synergistic effect is achieved. The organoclays as aforementioned are very effective and efficient in removing the high molecular weight substances and emulsified substances—even though they are markedly less efficient in removing dissolved low molecular weight organics. Thus one passes the organic contaminated system first through a column containing the organoclay. This removes the emulsified organics and the high molecular weight materials. It is, however, quite inefficient with respect to the low molecular weight substances. Then the effluent from the column is passed into a second column wherein granulated activated carbon is packed, or through air stripping unit, or both. The granulated carbon is highly efficient in removing the aforementioned low molecular weight substances. Since however the emulsified and higher molecular components are no longer present, the activated carbon can act with a new vastly improved efficiency.

It is thus found, in accordance with the invention, that this process results in much higher removal of total contaminants, and furthermore, the aqueous compositions can be passed through the columns for a longer period; i.e., much larger quantities are treated without fouling the carbon. Thus a true synergistic effect is achieved.

In a further aspect of the invention, the foregoing method may be advantageously used in the treatment of organic contaminated water wherein the contaminants are all of relatively high molecular weight—most notably including oils and/or greases, PCB's and the like. By employing successive columns of the organoclay and of the activated carbon, an extremely efficient and effective separation of such organics is achieved, since the bulk of such oily contaminants are removed by the organoclay (which has a very high capacity for absorbing same), leaving the very high affinity carbon to clean up the minute traces of oily contaminants which remain. More specifically, the organoclays typically can adsorb about twice their weight of oils and/or greases; while the activated carbon (even though having a very high affinity for the said contaminants) can only absorb about 5% of its weight of the oil and/or greases.

Thus for example the method of the invention can be effectively employed in treating a mixture of water, PCB's and oil. Such a mixture can result from a number of industrial situations—e.g. leakage of transformers. By first passing the aqueous mixture through the organoclay column, the bulk of PCB and oil contaminants are removed; remaining traces are then very effectively removed in the activated carbon column, which while having a much lesser capacity for absorbing the contaminants, has a higher affinity for same than the organoclay. If the same mixture were passed solely through the organoclay, substantial traces would remain; and if the mixture were passed only through the carbon, the carbon would very rapidly become blinded and ineffective.

The method of the invention can similarly be used in treatment of oil spills, for example in the vicinity of a desalinization plant, where very high effectiveness is necessary to safeguard the influent to the plant. The method of the invention functions to remove oil as just discussed, while at the same time the solubles are very effectively removed at the carbon column. Indeed insofar as soluble contaminants are concerned, the activated carbon can typically remove 10 to 40% of its weight of same, while the organoclay can only remove 10 to 20% of its weight.

BRIEF DESCRIPTION OF DRAWINGS

In the drawings appended hereto:

FIG. 4 is a further graph showing breakthrough curves for the effluent yielded by several methods, including the method of the invention, where the influent is a waste water containing specified contaminants.

DETAILED DESCRIPTION OF THE INVENTION

Figure 1:
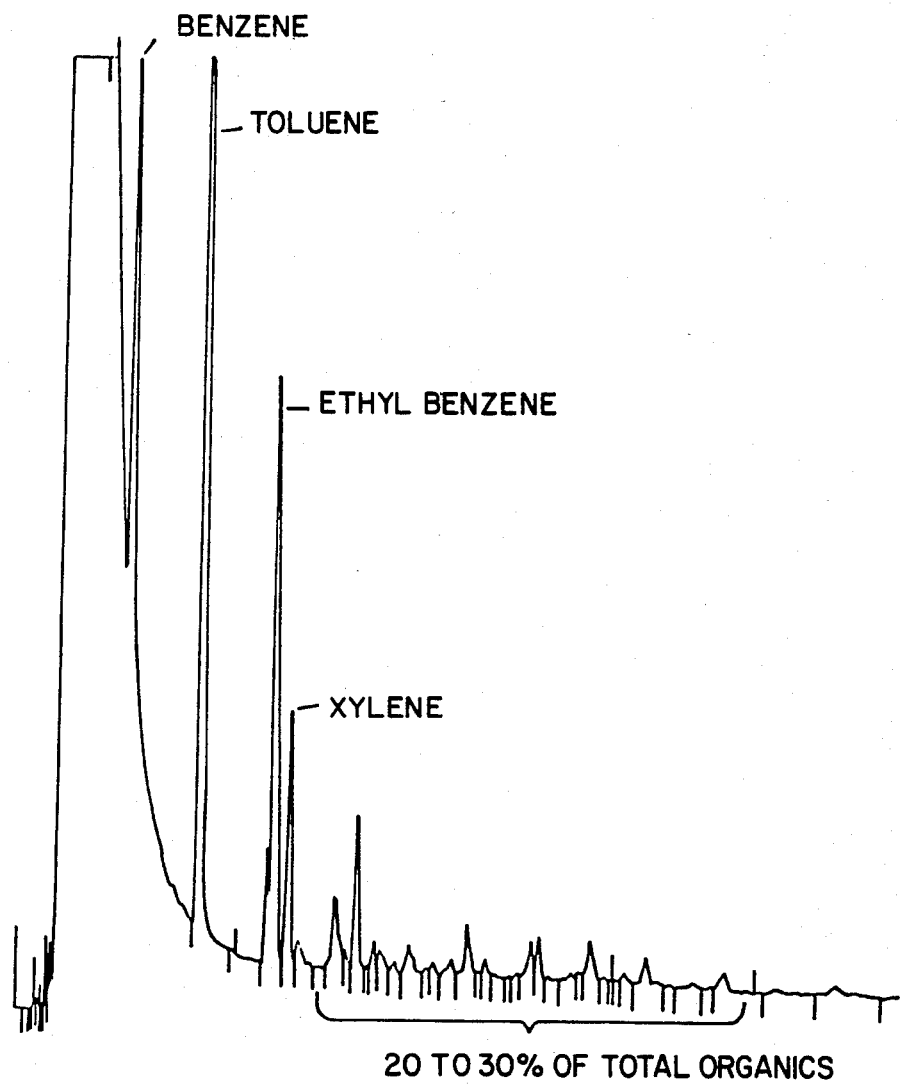
FIG. 1 is a gas chromatograph for an influent water sample which was treated in accordance with the present invention.

Organoclays are well known in the art as exemplified by the aforementioned patents to Hauser, Jordan, Kuritzkef, Oswald et al, Finlayson, and Finlayson et al, the entire disclosures of which are incorporated herein by reference. In this invention, the term "organoclay" refers to various clay types, e.g. smectites, that have organo ammonium ions substituted for cations between the clay layers. The term "organo ammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite type clays, particularly the smectite type clays which have a cation exchange capacity of at least 75 millequivalents per 100 grams of clay. Useful clays for such purposes include the naturally occuring Wyoming variety of swelling bentonite and similar clays, and hectorite, which is a swelling magnesium-lithium silicate clay. The clays, are preferably converted to the sodium form if they are not already in this form. This can be effected, by a cation exchange reaction with a soluble sodium compound. These methods are well-known in the art. Smectite-type clays prepared synthetically can also be utilized, such as montomorillonite, bentonite, beidelite, hectorite, saponite, and stevensite.

The organoclays useful in this invention include those set forth in U.S. Pat. No. 2,531,427 to Hauser. These organoclays are modified clays which exhibit in organic liquids, some of those characteristics which untreated clays exhibit in water. For example, they will swell in many organic liquids and will form stable gels and colloidal dispersions.

Generally, the quaternary ammonium salt substituted onto the clay has organic groups attached to the clay which will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e. dimethyl dioctododecyl 0:2, methyl benzyl dioctododecyl 1:2, dibenzyl dioctobenzyl 1:1, tribenzyl octadecyl 3:1, methyl dibenzyl octodecyl 2:1). The amount of alkyl ammonium salt substituted on the clay can vary between 0.5% to 50%.

In particular the preferred organoclay used in this invention comprises one or more of the following quaternary ammonium cation modified montmorillonite clays:

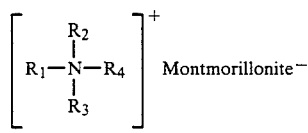

wherein $R_1$ is an alkyl group having at least 10 carbon atoms and up to, for example, 24 carbon atoms, and preferably having a chain length of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(-hydrogenated tallow) ammonium bentonite; and more generally quaternary ammonium cation modified montmorillonite clays represented by the formula:

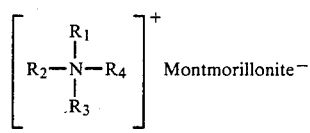

wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, and most preferably wherein 20% to 35% of said long chain alkyl radicals contain 16 carbon atoms and 60% to 75% of said long chain alkyl radicals contin 18 carbon atoms.

The montmorillonite clays which may be so modified are the principal constituents of bentonite rock, and have the chemical compositions and characteristics described, for example, in Berry and Mason, "Mineralogy", 1959, pp. 508–509. Modified montmorillonite clays of this type (i.e. organoclays) are commercially available from Southern Clay Products, Inc., Gonzales, Tex. under such trade designations as CLAYTONE 34 and 40, and are available from NL Industries, Inc., New York, N.Y. under such trade designations as BENTONE 27, 34, and 38. The preferred organoclays utilized in this invention, are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methyl bis(2-hydroxyethyl)octodecyl ammonium bentonite.

The aqueous compositions treated in this invention contain an amount of organic contaminant. Typical organic contaminants are the chlorinated organic compounds, e.g., DDT, BDD, DDE, 2, 4-dichlorophenol, tetrachloroethylene, and polychlorobiphenyl contaminants and other organics such as benzene, toluene, methylene chloride, chloroform, 1, 2 dichloroethane, 1,1,1-trichloroethane, trichloroethylene, tetrachloroethylene, 2-nitrophenol, pentachlorophenol, dimethy phthalate, Lindane, Arochlor1254, ethyl benzene, HCP, parathion, dichlorobenzene, hexachlorocyclopentadiene, ethylparathion, 2, 4-dinitrotoluene, naphtalene, pyrene, oils, humic acid and other toxic substance precursors, dibromochlororpropane (DBCP), and organics chelated with metals, The latter mentioned chelated metal is a metal that has formed a complex with an organic molecule. These complexes are quite inert to normal chemical reactions.

The invention is further illustrated by the following examples, which are to be considered only exemplary of the invention and not delimitive thereof:

EXAMPLE I

Laboratory tests were conducted treating gasoline-contaminated water with organoclays and granulated activated carbon (GAC). The contaminated water was obtained by saturating tap water with gasoline pumped from a groundwater/gasoline lens in a western U.S.

location. Equilibration resulted in water with a TOC (total organic content) of approximately 50 ppm; its gas chromatograph is seen in FIG. 1. The chromatographic analysis indicates that approximately 70–80% of the organics present are composed of benzene, toluene, xylene, and ethylbenzene. The remaining 20% to 30% are unidentified higher molecular weight species.

EXAMPLE II

Testing of the contaminated water samples of Example I was conducted in three parts: (1) organoclay treatment alone; (2) GAC alone; and (3) organoclay followed by GAC.

The organoclay utilized in this and the remaining Examples with a dimethyl di(hydrogenated tallow) ammonium bentonite. In each test, five (5) grams of material (organoclay or GAC) was diluted with forty-five (45) grams of inert material in order that breakthrough could be reached in a reasonable amount of time. The test material was packed into columns $\frac{3}{4}$ in. diameter and 10 in. length. The columns were operated at a flow of 0.25 gmp/ft. Breakthrough curves for each experiment are given in FIG. 2. By "breakthrough" is meant the percentage of organics in the influent which are detected in the effluent, so that e.g. 100% breakthrough means that the concentration of organics in the effluent is the same as in the influent.

The breakthrough curve for the organoclay when used alone is characterized by rapid breakthrough of benzene (solubility 1800 ppm) followed by toluene (sol. 700 ppm) and xylene (sol. 200 ppm). However, the curve never reaches 100% breakthrough, leveling at approximately 80%. This effect is due to the organoclay's high affinity and capacity for the higher molecular weight (less soluble) fractions of the gasoline.

Figure 2:
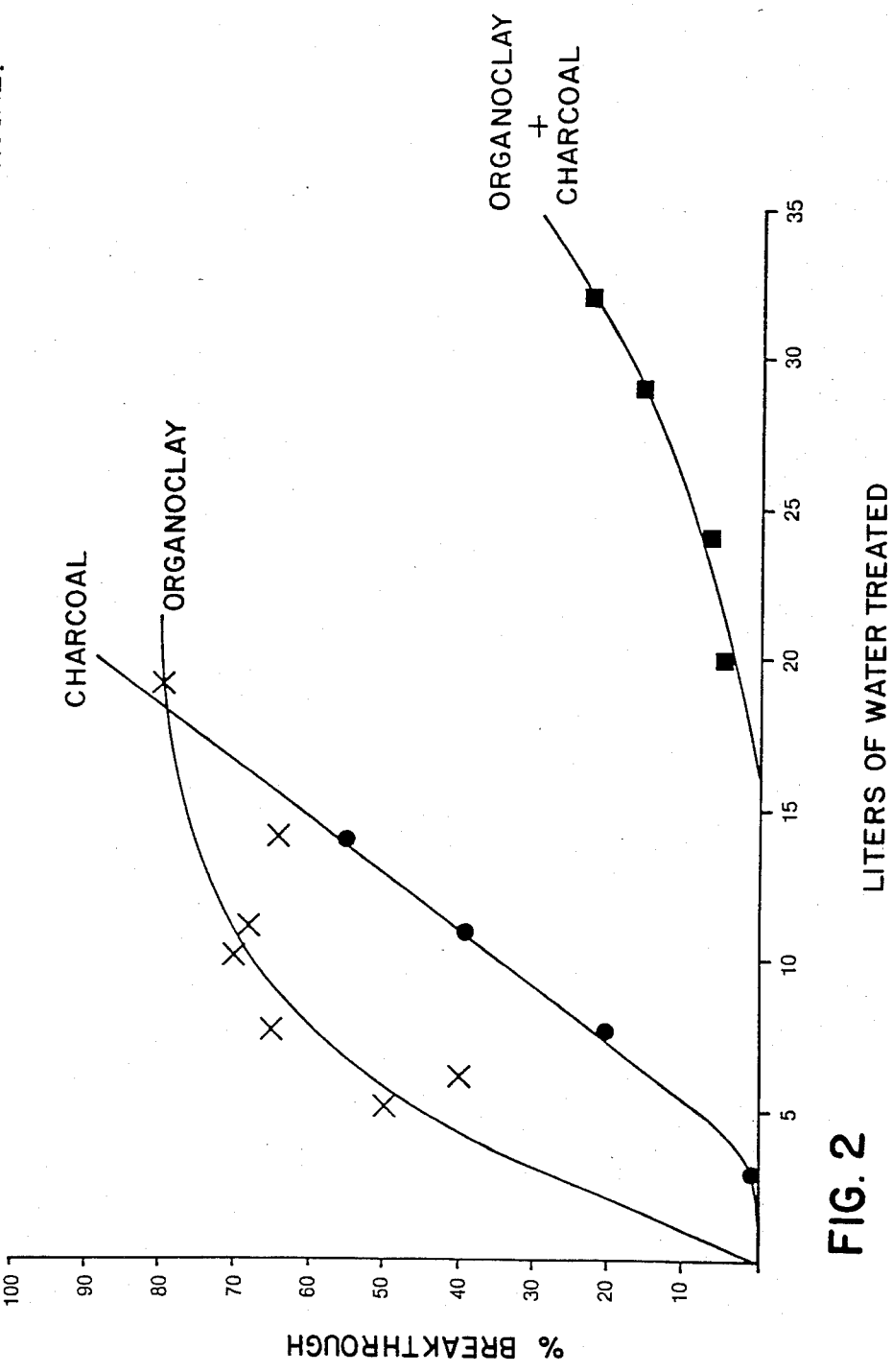
FIG. 2 is a graph showing breakthrough curves for the influent of FIG. 1 when treated by several methods, including by the method of the present invention.

The breakthrough curve for GAC used alone is also seen in FIG. 2. This curve shows a fairly rapid breakthrough that crosses the organoclay line and reaches 100% quickly. In fact the GAC rapidly loses its effectiveness in the presence of higher molecular weight materials, especially oils.

Finally, the combination, organoclay followed by GAC, is seen to yield a breakthrough curve that could not be derived from the summation of the other two individual curves. The combination of organoclay and GAC yields substantially superior results compared to either material used alone.

EXAMPLE III

Figure 3:
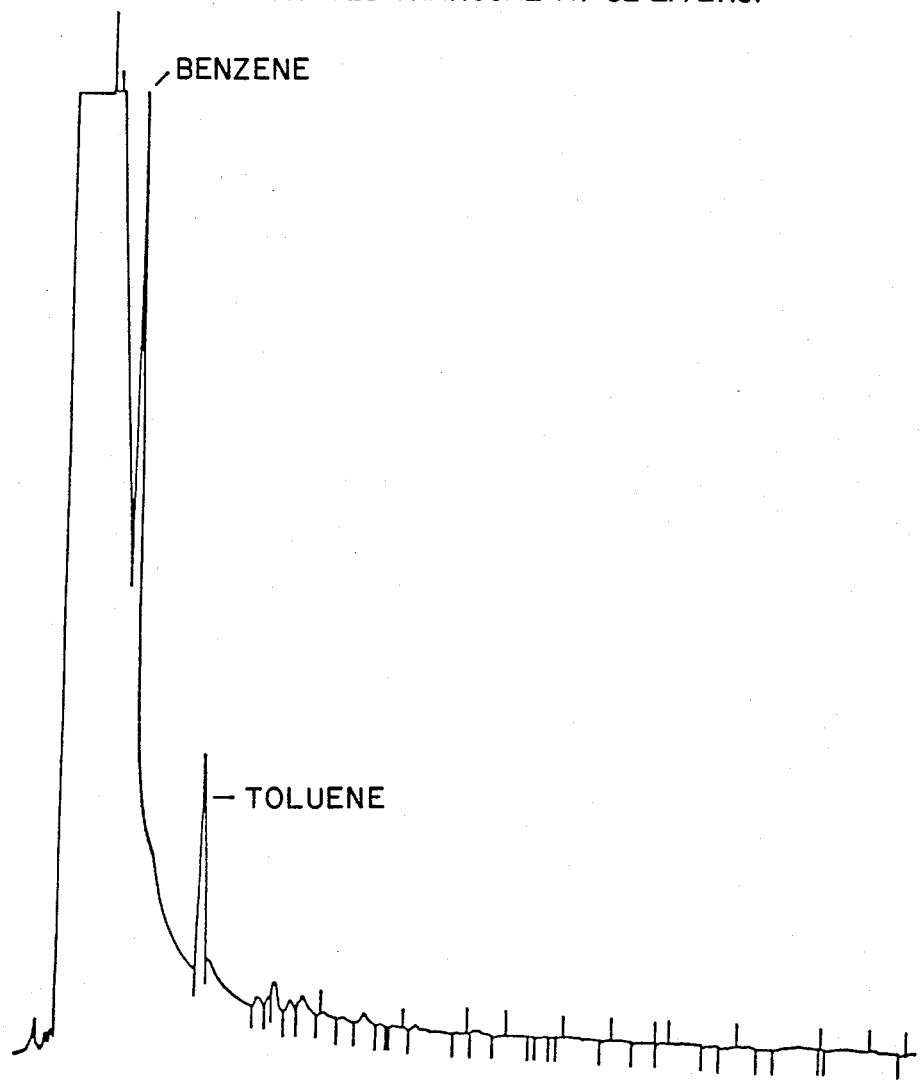
FIG. 3 is a gas chromatograph for an effluent yielded by practice of the invention on the water sample of FIG. 1.

The effluent resulting from treatment with the organoclay followed by GAC was analyzed by gas chromatograph to provide the curve of FIG. 3. Benzene, along with toluene, account for 85% of the breakthrough. This positive synergistic combination is believed to be a function of the organoclay's ability to prevent "blinding" of the GAC by the higher molecular weight components of the gasoline and any emulsified gasoline.

EXAMPLE IV

Tests were conducted in this Example on a waste water that contained 200 ppm oil and grease and 200 ppm toluene. The experiments were conducted in three ways: (1) organoclays alone; (2) activated carbon alone; and (3) organoclay followed by activated carbon.

Each column contained 5 grams of the organoclay or activated carbon (FS-300 product of Calgon) diluted with 45 grams of anthracite. The columns were 10" by $\frac{3}{4}$" diameter and were operated at a flow rate of 0.25 gpm/ft$^2$.

The breakthrough curves for the three experiments can be seen in FIG. 4. It can be seen that both the carbon and organoclay breakthrough rapidly on the toluene (carbon at $\simeq$3 liters and organoclay at $\simeq$4 liters). The operation in tandem has not reached breakthrough at over 13 liters. The cost savings are substantial when compared to carbon alone since organoclays hold about twice their weight in oil. This means that in the tandem operation the carbon will be changed every 3.5 times for each change of organoclay. With carbon alone 17 changes of carbon would be required to treat the equivalent amount of water. At approximate current costs this would give a treatment cost of 0.6¢/gal. for the organoclay/activated carbon tandem operation and a 1.1¢/gal. cost for carbon alone. Further, this does not reflect the savings in labor associated with bed change out and transportation for regenerating carbon—which further substantially increases the cost of the carbon system.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for removing organic contaminants from an aqueous composition contaminated with mixtures of said organic contaminants, comprising:
    passing the composition through a first column packed with an organoclay, to adsorb substantial quantities of high molecular weight and/or emulsified components of said organic contaminants; and
    passing the effluent from said first column through further separating means consisting of activated carbon, air stripping means and combinations of the same for separating substantial quantities of the low molecular weight components of said organic contaminants which remain in the effluent from said first column; and
    recovering the effluent from said further separating means as product.

2. A method in accordance with claim 1, wherein said further separating means comprises a column packed with porous activated carbon.

3. A method in accordance with claim 2, wherein said carbon comprises granulated activated charcoal.

4. A method in accordance with claim 1, wherein said further separating means comprises an air stripping tower.

5. The method of claims 1, 2 or 3, wherein the organoclay is a higher dialkyl dimethyl ammonium organoclay.

6. The method of claims 1, 2 or 3, wherein the organoclay is a dimethyl benzyl (hydrogenated tallow) ammonium clay.

7. The method of claims 1, 2 or 3, wherein the organoclay is a dimethyl di(hydrogenated tallow) ammonium clay.

8. The method of claims 1, 2 or 3, wherein the aqueous composition is a gasoline-water mixture.

9. The method of claims 1, 2 or 3, wherein the aqueous composition includes PCB's and an oil.

10. An improved method for separation of high molecular weight organic contaminants from an aqueous composition contaminated therewith, comprising:
  passing the composition through a first column packed with an organoclay to absorb the bulk of said contaminants; and
  passing the effluent from said first column through a second column packed with porous activated carbon to remove substantial quantities of the remaining traces of said contaminants.

11. A method in accordance with claim 10, wherein said contaminants include oils and/or greases.

12. A method in accordance with claim 10, wherein said contaminants include oils and PCB's.

13. A method in accordance with claim 10, wherein the aqueous composition further includes low molecular weight water soluble contaminants, said soluble contaminants being primarily separated at said second column.

* * * * *